3 Sheets—Sheet 1.

O. GASSETT,

Assignor, by mesne assignments, to R. PITCAIRN and G. H. CHRISTY, trustees.

HYDRAULIC AND ELECTRIC INTERLOCKING APPARATUS.

No. 10,434. Reissued Jan. 8, 1884.

WITNESSES

Wm A. Skinkle

Carrie E. Ashley

INVENTOR

Oscar Gassett,

By his Attorneys

Pope Edgecomb & Butler

THE NORRIS PETERS CO., PHOTO-LITHO., WASHINGTON, D. C.

O. GASSETT,
Assignor, by mesne assignments, to R. PITCAIRN and G. H. CHRISTY, trustees.
HYDRAULIC AND ELECTRIC INTERLOCKING APPARATUS.
No. 10,434. Reissued Jan. 8, 1884.
Fig. 3,
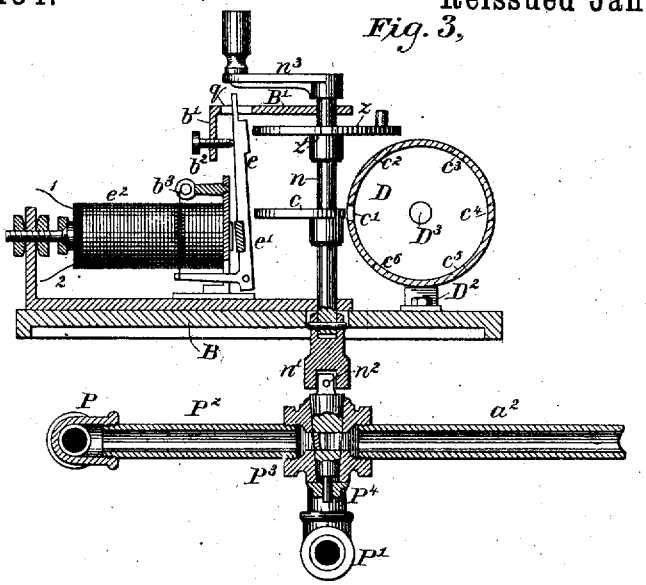
Fig. 4,
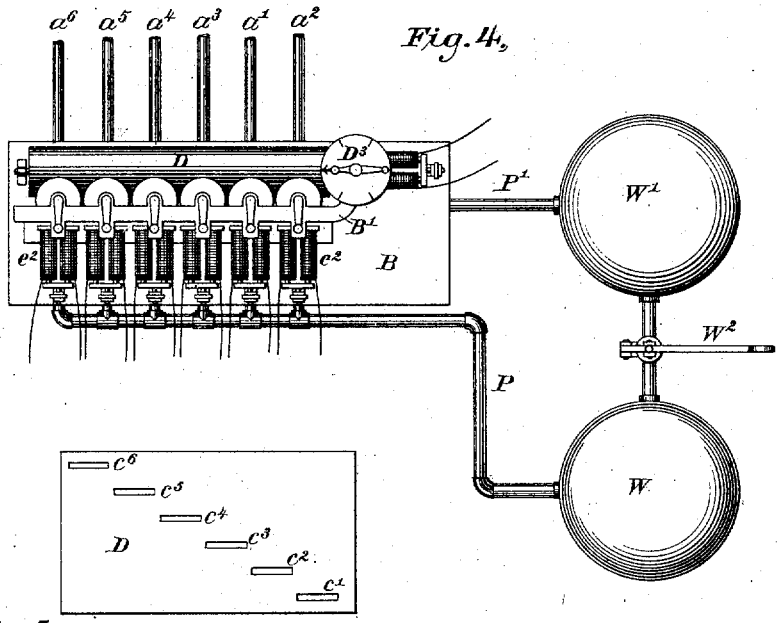
Fig. 5,
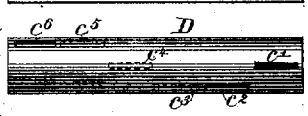
WITNESSES
Wm A. Skinkle
Carrie E. Ashley
By his Attorneys
INVENTOR
Oscar Gassett,
Pope Edgecomb & Butler
THE NORRIS PETERS CO., PHOTO-LITHO., WASHINGTON, D. C.

O. GASSETT,
Assignor, by mesne assignments, to R. PITCAIRN and G. H. CHRISTY, trustees.
HYDRAULIC AND ELECTRIC INTERLOCKING APPARATUS.
No. 10,434. Reissued Jan. 8, 1884.
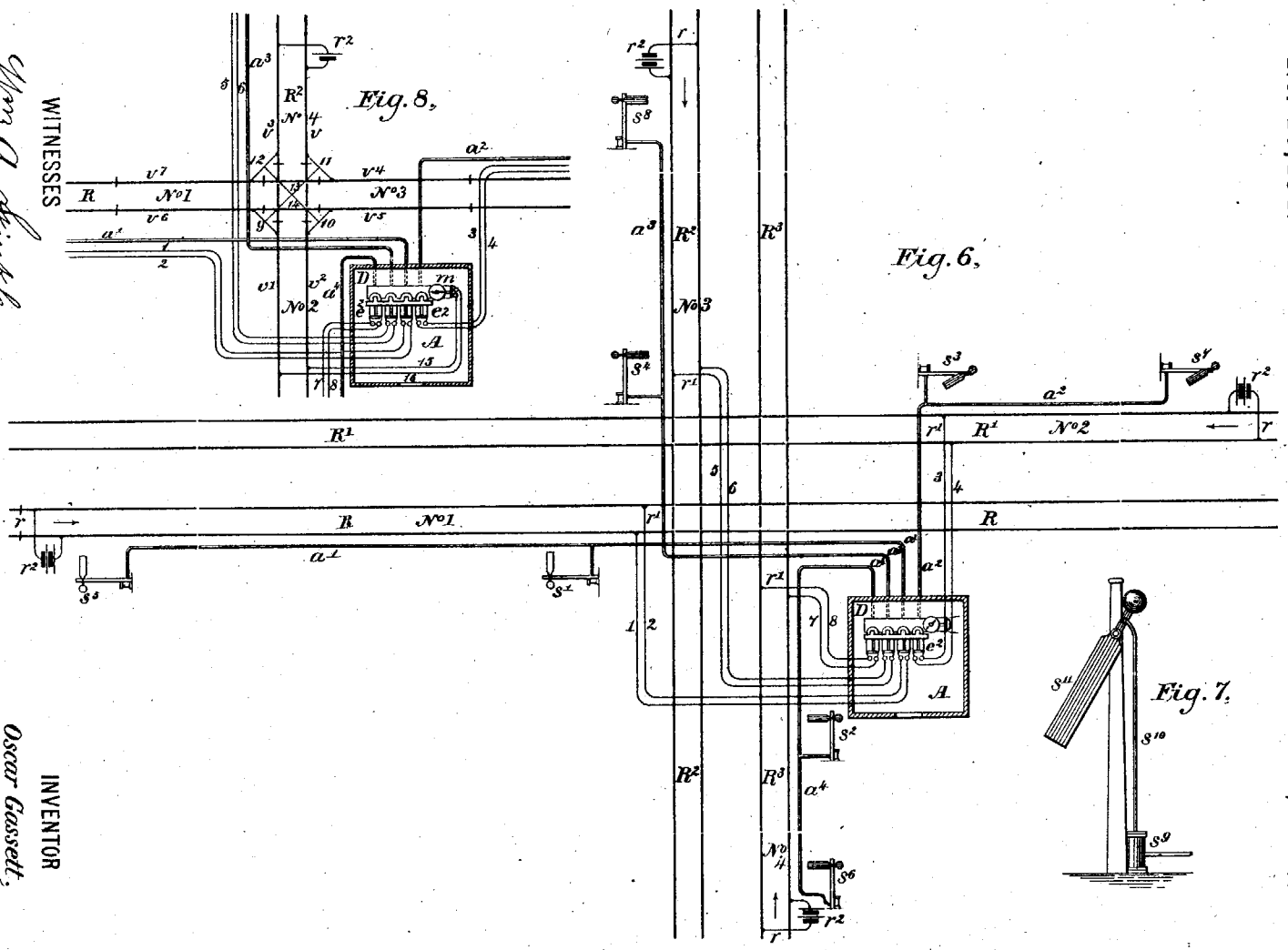
WITNESSES
Wm A. Skinkle
Carrie E. Ashley
INVENTOR
Oscar Gassett,
By his Attorneys
Pope Edgecomb & Butler.
THE NORRIS PETERS CO., PHOTO-LITHO., WASHINGTON, D. C.

UNITED STATES PATENT OFFICE.

OSCAR GASSETT, OF BOSTON, MASSACHUSETTS, ASSIGNOR, BY MESNE ASSIGNMENTS, TO ROBERT PITCAIRN AND GEORGE H. CHRISTY, TRUSTEES, OF PITTSBURG, PENNSYLVANIA.

HYDRAULIC AND ELECTRIC INTERLOCKING APPARATUS.

SPECIFICATION forming part of Reissued Letters Patent No. 10,434, dated January 8, 1884.

Original No. 266,957, dated October 31, 1882. Application for reissue filed December 13, 1883.

DIVISION A.

*To all whom it may concern:*

Be it known that I, OSCAR GASSETT, a citizen of the United States, and a resident of Boston, in the county of Suffolk, State of Massachusetts, have invented or discovered a new and useful Improvement in Hydraulic and Electric Interlocking Apparatus; and I do hereby declare the following to be a full, clear, concise, and exact description thereof, reference being had to the accompanying drawings, making a part of this specification, in which—like letters indicating like parts—

Figure 1:
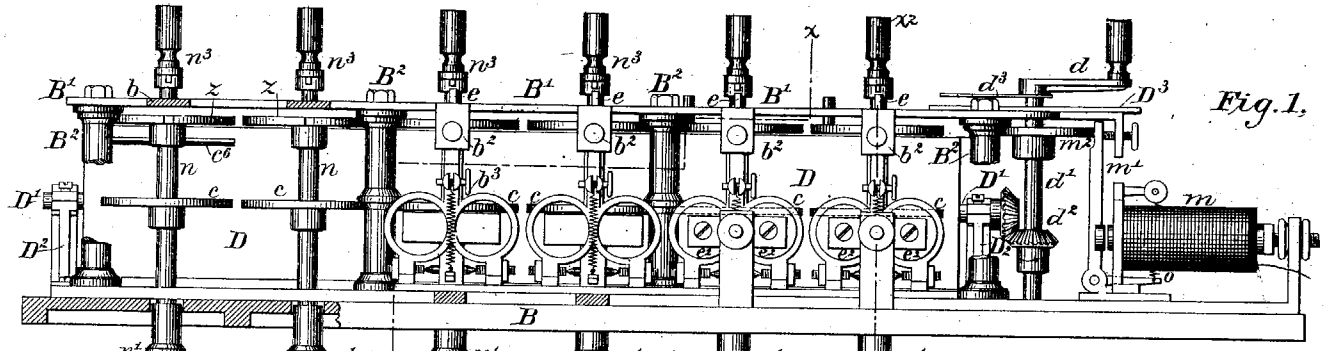
Figure 2:
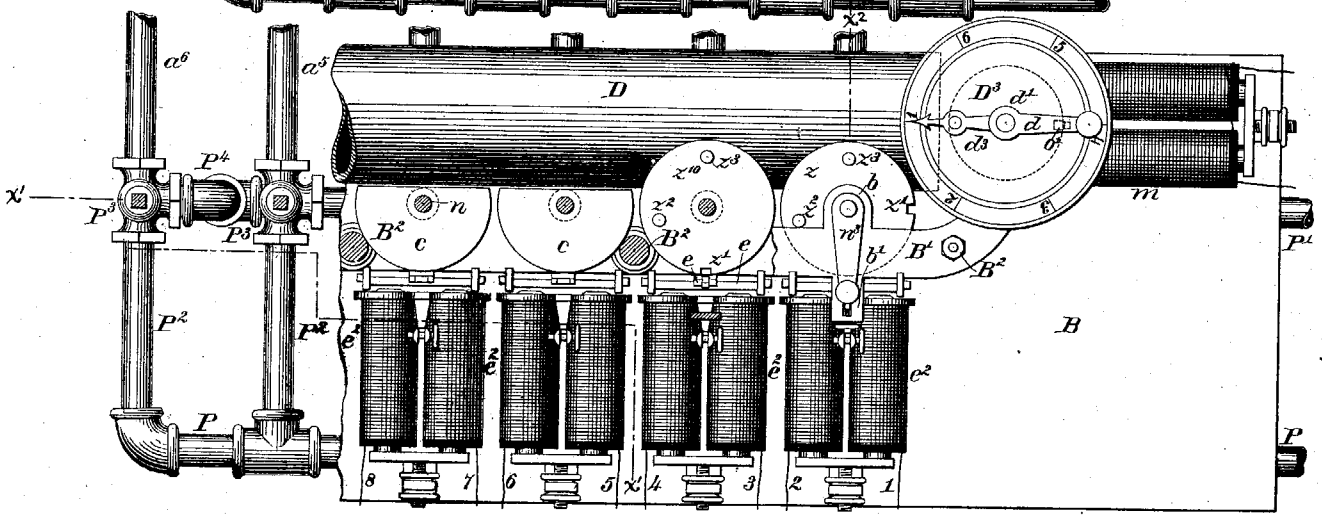

Figure 1, Sheet 1, is a view in elevation, partly sectioned in the plane of the line $x' x'$ of Fig. 2, illustrative of the main operative parts of my improved mechanism. Fig. 2 is a top or plan view of the same apparatus, but sectioned in part in the plane of the line $x x$ of Fig. 1. Fig. 3, Sheet 2, is a transverse sectional view in the plane of the line $x^2 x^2$, Fig. 1. Fig. 4 is a plan view to a reduced scale of the apparatus of Sheet 1, and showing the same in its relationship to the fluid-pressure supply and discharge. Fig. 5 is a detached view of the slotted rotating cylinder employed, said cylinder being drawn to the same scale as in Fig. 4, and being represented in elevation and diagrammatically unfolded or developed, as on a plane. Fig. 6, Sheet 3, is a diagrammatic view of the complete apparatus as organized for operating the signals of a double-track grade-crossing. Fig. 7 is a view in elevation of signal-post suitable for use in this organization, with its semaphore-signal and operative mechanism; and Fig. 8 illustrates a modified organization, such as is suitable for a single-track crossing.

My present invention relates, in general terms, to the construction of an improved apparatus for employing fluid-pressure in the operation of railway and other like signals, whereby, among other conditions, it is impossible to set one signal at "safety" until all other signals which ought to be at "danger" are properly set, and also when a signal is set at "safety" all or any desired number of danger-signals are locked at "danger." In like manner, also, safety or "go-ahead" signals may be locked in that position by a starting-signal, and the latter be incapable of being set in a starting position until the go-ahead or safety signals are properly set.

My invention also includes as a part of the system an arrangement of electric track-circuits, by which any desired signal (as, for example, the signal the setting of which makes a lock) is itself automatically locked and kept locked so long as such position or condition is desirable or essential to safety.

Referring for the present to Figs. 1 to 5, I will first describe my fluid-pressure interlocking apparatus.

P represents a main supply-pipe, which takes its supply from any suitable tank or accumulator, W, Fig. 4, and P′ is a main discharge-pipe, through which waste water or other liquid is run into a tank, W′, Fig. 4, and from which it may be pumped back into W by any suitable pump, $W^2$. Assuming for the present that six signals or sets of signals are to be operated, branch pipes $P^2$, six in number, lead from the main supply-pipe P through cocks and cases $P^3$, and from the opposite ports of these cock-cases the signal-pipes $a'$ to $a^6$ lead off and extend to the signal-cylinders, so that when fluid-pressure of any one is turned on the corresponding signal will be set, say, at "safety," and when turned off it will assume a reverse position, as presently to be explained. From a side port in each cock-case a discharge-branch, $P^4$, leads to the main discharge-pipe P′. Understanding that the cock in each cock-case $P^3$ is a three-way cock, the skilled constructer will readily know how to make and fit or adjust it so that fluid-pressure from P may be applied in the signal-cylinders to set the signals at "safety," (the waste through $P^4$ and P′ being then cut off,) or so that the fluid-pressure from P may be cut off and the waste opened through $P^4$ and P′, in order to let the signals go to "danger." These and the other parts of the machine may be supported upon any suitable base or pedestal, B, and a plate, B′, supported on posts $B^2$, constitutes a means of supporting other devices, as presently to be described.

The rectangular head $n^2$, Fig. 3, of each cock has a socketed wrench-head, $n'$, fitted thereon, and through this a rotary motion is imparted to the cock from a shaft, $n$, and rotary motion is given to the shaft by a crank or handle, $n^3$, or other suitable contrivance. In this manner the cocks are turned so as to apply and release fluid-pressure, as may be desired. The upper ends of the shafts $n$ pass through eyes in projections $b$, made on the edge of the plate B', Fig. 2. It will be observed that these cock shafts or stems $n$ are arranged side by side in a row, and the number may be varied at pleasure, or as the work to be done may require.

In order, now, to provide for interlocking, so that the setting of any one cock so as to place a signal, say, at "safety" may lock the cocks of any or all other signal-pipes, I arrange on each cock-stem $n$ a disk, $c$, Figs. 1, 2, and 3, which is flattened or cut away on one side, and assuming the flattened or cut-away sides of all the disks to be outward, as in Fig. 3, I mount a rotary cylinder, D, along opposite to such disks, and so that its periphery shall be in close proximity to the cut-away sides of the disks. This cylinder is preferably made hollow and of sheet metal, and is axially mounted on a shaft, D', which rests on suitable bearings, $D^2$. Then in this cylinder I make a series of slots, $c'$ to $c^6$, each of such size that when in the rotation of the cylinder D a slot comes opposite to and level with its corresponding disk such disk may then be rotated with its full side into the slot, and thereby lock the cylinder as against any further motion on its axis; but ordinarily no two slots are made in line with each other; hence a full or unslotted part of the cylinder will, in the case supposed, be opposite to each of the other disks, and the cylinder being locked, as already stated, all other disks will be locked, as a result of which all other cocks will likewise be locked, as well as the signals corresponding thereto. Or, to illustrate further, assume all signals to be at "danger," and that the cock of Fig. 3 operates the signal or signals to indicate "line clear" or "go ahead" on any predetermined line of track. The cylinder D is then to be turned until the slot, $c'$, corresponding to the disk on that cock-stem shall be opposite such disk. The slots, $c^2$ to $c^6$, corresponding to all other disks are then away from a position opposite their respective disks, and the full face of the cylinder, coming opposite the flattened or cut-away sides of such other disks, locks them as against a rotary movement, and the corresponding signals are likewise locked at "danger;" but the disk $c$ of Fig. 3 is at the same time unlocked, so that its full side may be turned into the slot $c'$, and thereby lock the cylinder, and the same motion which does this opens the cock below, so as to let on fluid-pressure and put the corresponding signal at "safety." Reversing this motion unlocks the cylinder D and puts the signal or signals back to "danger," after which the cylinder can be again rotated, so as to bring some other slot in the series (say $c^2$, Figs. 3 to 5) opposite to its disk, in which case the latter is unlocked and all the rest are locked.

As a means of rotating the cylinder D, I have shown in Fig. 1 a crank, $d$, shaft $d'$, and bevel-gearing $d^2$, though other suitable means may be employed. Also, each cock may be numbered, and a corresponding number be arranged on a dial-plate, $D^3$, so that by the use of a pointer, $d^3$, fixed on the shaft $d'$, the operator or signal-man may be guided in rotating the cylinder. Thus, for example, these parts may be so combined that when the pointer comes to number 1 it indicates that the proper slot, $c'$, in the cylinder is opposite to the disk $c$ of cock and signal number 1, and so on for other numbers. The relative arrangement or spacing of the slots $c'$ to $c^6$ is more particularly illustrated in Fig. 5, those which are shown by dotted lines being on the back side of the cylinder. Also, in Fig. 3 I have illustrated the spacing by showing them in dotted lines; but for some purposes it may be desirable to have two disks unlocked at the same time. In such case the two slots corresponding thereto may be made in line with each other, so that each shall at the same time come opposite its respective disk; but the operation of locking the remaining disks will still be the same. The arrangement of such an apparatus, together with an electrical locking and unlocking mechanism, is more particularly shown in Fig. 6, where A represents a signaling-cabin in convenient proximity to a double-track crossing. As shown in this figure, the cylinder D and appliances belonging thereto are represented as organized for such a system of tracks, only four cocks, disks, slots, &c., here being necessary. This figure also shows in this organization the connections of the electrical features of the apparatus, as presently to be described.

The intersecting tracks are indicated at R to $R^3$, and the intended direction of regular trains thereon is indicated by arrows. Each track has, on the side of the crossing from which a train approaches, an insulated electrically-connected section, $r\ r'$, with its opposite rails connected to the opposite poles of a battery, $r^2$, at or near the outer end, and by wires 1 to 8 with a corresponding series of electro-magnets, $e^2$, in the cabin A. Home signals $s$ to $s^4$ are put up at a suitable distance from the crossing on each track, and also distant signals $s^5$ to $s^8$. These signals are intended to be operated by fluid-pressure, and in the present case by hydraulic power. One convenient construction is shown in Fig. 7, where $s^9$ is the fluid-pressure cylinder, $s^{10}$ the piston-rod, and $s^{11}$ the semaphore-arm, which is actuated by the movements of the piston within the cylinder.

As shown in Fig. 6, the signals $s^3$ and $s^7$ on track-circuit number 2 are represented as down, or in a vertical position, and indicate "safety." All the other signals are shown as up, or in "danger" position; but any other suitable form or construction of signal may be employed, the one shown being simply adopted for convenience of illustration. Any suitable arrangement or construction of fluid-pressure pipes $a'$ to $a^4$ may lead from the apparatus in the cabin A to the several signal-cylinders, such as will convey the pressure employed to the signal-cylinders and permit its reflow as the valves are set for one operation or the other.

The several rail-circuits I have marked, respectively, number 1, number 2, number 3, and number 4, and for convenience in further description will so designate them hereinafter.

The electrical part of my invention relates to the combination, with the rotary cock stems or shafts such as described, of closed track-circuits such as described, so that, such track-circuits being short-circuited by the approaching train, electrical change will take place to cause the locking of the signal or signals by which the movement of that train is governed; or the apparatus may be organized to lock any desired one of a series of signals. To this end (referring again to Figs. 1 to 3) I affix on each cock-shaft $n$ a disk, $z$, and notch the same, as at $z'$, Fig. 2, in such position that when the corresponding cock is set, say, for the passage of a train, such notch will come opposite to the swinging end of an armature-lever, $e$, Fig. 3. The armature $e'$ of each lever is actuated by an electro-magnet, $e^2$, and the coils of such electro-magnets are included in the track-circuits of the rail-sections $r$ $r'$, Fig. 6, through the wires 1, 2, &c. Thus it will be understood that so long as each such circuit is unbroken and no train or car is on such track-section the corresponding armature-lever, $e$, is held clear of the disk $z$; but when the disk $c$ corresponding to any signal or line of signals is rotated so as to lock the cylinder D and indicate "line clear" to an approaching train, and the disk $z$ is thereby rotated till its notch $z'$ comes opposite the corresponding armature-lever, $e$, such approaching train, as soon as it enters on the track-section so cleared, will short-circuit the electric current thereof, so as to divert the same from the electro-magnet, and the armature-lever $e$ will then enter the notch $z'$, and all the signals will be locked, and must remain locked until the train has entirely left that track-section. Each track-section has, as illustrated in Fig. 6, its own electro-magnet, armature-lever, and electric locking-disk. It will, then, be impossible for the operator to reverse a signal after a train has entered upon a track-circuit.

It will be observed that the plate B' has a projection, $b'$, Figs. 2 and 3, at each armature, which is slotted, as at $q$, Fig. 3, for the projecting end of the armature-lever, and also that the downwardly-bent end $b^2$, Fig. 3, affords a bearing or support for the usual regulating-screw. The usual retractile springs, $b^3$, are also to be added.

Returning now to Fig. 6, assume that a train is approaching on the track wherein is the rail-circuit number 2. Normally all signals are at "danger," all circuits are closed so as to keep the disks $z$ electrically unlocked, and all the disks $c$ are clear of the cylinder-slots. The operator turns the cylinder D till slot $c'$, Fig. 5, comes opposite the corresponding disk $c$, and then the latter is unlocked and all other disks are locked. He then turns the shaft $n$ of such unlocked disk so as to turn the disk $c$ into its slot $c'$, and so lock all the other connections and secure their signals at "danger," and in so doing he turns the cock $P^3$ so as to let fluid-pressure on by the line $a^2$, Fig. 6, and set the signals $s^3$ and $s^i$ at "safety." The train then approaches, and as soon as the first pair of wheels and axle pass the outer insulated point of track-circuit number 2 it short-circuits the same and diverts the current from the corresponding electro-magnet, so that its armature-lever, being thus released, shall fall back and enter the notch $z'$ of the corresponding disk, $z$, and thereby the signals $s^3$ and $s^i$ will be locked at "safety," and will remain so until the train shall have entirely left track-circuit number 2. From this explanation it will be readily understood how the signal-man is in like manner enabled to clear any of the other tracks and lock the corresponding signals in their proper position.

In the arrangement of the apparatus for the uses contemplated in Fig. 6, slots $c'$ and $c^3$ may be in line with each other, or in the same plane and on the same side of the cylinder, and the third and fourth may in like manner be in line with each other, but out of line with the first and second. This results from the fact that trains may safely be run over both the tracks R and R' at the same time, the signals on the intersecting tracks $R^2$ $R^3$ being set at "danger," or vice versa.

As regards the disks $z$, it should also be noted that each disk is provided with two stop-pins, $z^2$ $z^3$, Fig. 2, suitably arranged to provide for the proper movement of its corresponding locking-disk $c$, or, in other words, so that when the disk $c$ is rotated out of its slot one pin (say $z^2$) will come against the edge of the bar or plate B', and when rotated into the slot and the notch $z'$ is brought opposite its armature-lever the other pin, $z^3$, will engage the edge of the plate B'. In this manner, or by other suitable means, I provide for giving to each stem or shaft $n$ the proper motion, and no more; but the apparatus may, if desired, be so organized that the electric locking, instead of being applied to the disk $z$, which governs the movement of the train, may be applied to any other disk, so as to lock the signal corresponding thereto at "danger," but leave the disk the signal of which governs the movement of the train free to be turned at pleasure, so as to stop the train when necessary. To illustrate this I have specially marked one of the $z$ disks in Fig. 2 with the letter $z^{10}$, and the notch $z'$ in this disk is to be so arranged that it will come opposite to its armature-lever when the corresponding signals on the track $R^2$, Fig. 6, are at "danger." If, now, the corresponding electro-magnet be electrically connected with rail-circuit number 2, the train, when it enters upon such circuit, will demagnetize such electro-magnet and lock the signals $s^4$ and $s^5$ at "danger" independently of any locking action of any disk $c$. Other changes or arrangements of circuits may be made at pleasure with reference to electrically locking, by means of armature-levers and disks, as described, any one or more of the fluid-pressure cocks $P^3$, as the work to be done may render desirable or necessary; but instead of providing a separate electro-magnet, armature, and locking-disk for each signal or set of signals, or for each operating-cock, as thus explained, the same result of locking the signals when properly set may be effected on a single-track crossing in which trains run in both directions upon each track by the use of a single electro-magnet, as illustrated in Fig. 8. Here R and $R^2$ represent two crossing tracks, and the apparatus is organized so that a train approaching or standing on either track or across or near to the crossing will demagnetize the electro-magnet the armature-lever of which makes the lock. To this end I arrange the insulated track-sections numbers 1, 2, 3, and 4 with their inner ends so near to the crossing that the rear truck of a car of ordinary length cannot leave one until its forward truck has run onto another. The adjacent rails of track-circuits numbers 1 and 2 are connected electrically by wire 9, numbers 2 and 3 by wire 10, numbers 3 and 4 by wire 11, and numbers 4 and 1 by wire 12; also, wires 9 and 11 are connected together electrically by wire 13, and wires 10 and 12 by wire 14. In this organization and use of the apparatus, wires 1 to 8 may run to distant circuits or signals for special uses; or they may, with the electro-magnets $e^2$, disks $z$, and other connected electrical appliances, be dispensed with. The pipes $a'$ to $a^4$ may lead to home and distant signals, as illustrated in Fig. 6.

In the apparatus of Fig. 8 I make use of a single electro-magnet, $m$, which in its relationship to the cylinder D is shown in Figs. 1 and 2. It is arranged opposite the end of the cylinder, and so that its armature-lever $m'$ may, when its circuit is closed or unbroken, stand clear of a disk, $m^2$, arranged on the shaft $d'$, through the agency of which the cylinder D is rotated, as already described, and also so that when the circuit of electro-magnet $m$ is short-circuited by an incoming train, or by a train standing on the crossing, the armature-lever $m'$, acted on by a spring, $o$, will enter a notch, $o'$, in the periphery of the disk $m^2$, said notch being indicated by dotted lines in Fig. 2. The electro-magnet $m$ is to be electrically connected with any of the track-circuits (as, for example, number 2, Fig. 8) by wires 15 and 16. Assuming, now, all signals to be at "danger," electrical action will take place from battery $r^2$, Fig. 8, through rails $v$, wires 11, 13, and 9, rails $v'$, wire 16, electro-magnet $m$, wire 15, rails $v^2$, wires 10 14 12, and rails $v^3$, back to the battery $r^2$. The armature-lever $m'$ will now stand clear of the disk $m^2$, and the cylinder D will accordingly be unlocked. The operator, by turning the handle $d$, can bring any one of the cylinder-slots (say slot $c'$, Fig. 5) opposite its disk $c$, and then by turning this disk into its slot he will open the proper cock $P^3$ to set the proper signals at "safety"—as, for example, on line R. This movement of the handle $d$ will bring the notch $o'$ of the disk into position opposite the armature-lever $m'$. Then, as soon as the incoming train enters on track-circuit number 3, or while any part of it remains on number 3, the battery-current will be diverted from electro-magnet $m$, and its armature-lever $m'$ will enter the notch $o'$, and so lock the disk $m^2$, and thereby lock the cylinder D, as well as all the cocks $P^3$ and all the signals. Electrical action will then take place from battery $r^2$, through rails $v$, wire 11, rails $v^4$, wheels, and axle, to $v^5$, thence by wires 10, 14, and 12 to rails $v^3$, and to the battery. If a truck be standing on track-circuit number 1, the electro-magnet $m$ will be cut out, as before, and the electrical action will take place from $r^2$, by $v^3$ 12 $v^1$, wheels and axle $v^6$, 9, 13, 11, and $v$, to battery. The same will be true as regards the other two track-circuits, except that if a truck be on number 2 electrical action from $r^2$ will be by $v^3$ 12 14 10 $v^2$, wheels and axle $v'$, 9, 13, 11, and $v$, to battery; but if on number 4, then by $v^3$, wheels and axle and $v$, to battery. In any case all conflicting signals will be locked so long as a train or any part thereof remains on or near the crossing, and the apparatus will be so locked that no collision can occur unless it be by a following train.

The cylinder D may be made in sections or of a series of notched or recessed rings arranged on a common shaft, and such construction is included herein as the mechanical equivalent of the cylinder D in the combinations set forth, but as a separate construction forms the subject-matter of a separate application.

I do not claim herein the combination of independently-insulated sections of railroad track extending in different directions from a crossing, with a battery and an electro-magnet connected with the lines of rails of the sections, as shown in Fig. 8 of the accompanying drawings, whereby a continuous electric current from the battery traverses the electro-magnet, except when diverted therefrom by the establishment of a direct connection between the insulated rails of one or more of said insulated sections, as this specific organization of circuits, apart from its combination with the rotating slotted cylinder and other hydraulic interlocking mechanism, forms the subject-matter of another division of this reissue application.

I claim herein as my invention—

1. In an interlocking railway signaling apparatus, a rotary cylinder having in its periphery a series of two or more slots or recesses, arranged out of line with each other, both circumferentially and longitudinally, in combination with a corresponding number of rotary disks adapted to be rotated into and out of the cylinder-slots, substantially as set forth.

2. The combination of slotted cylinder D, two or more locking-disks, *c*, and two or more fluid-pressure cocks, $P^3$, substantially as set forth.

3. In combination with slotted cylinder, locking-disks, and fluid-pressure cocks, a fluid-pressure-supply pipe, P, a waste-pipe, P′, and a series of two or more transmitting-pipes leading to the signals to be actuated, substantially as set forth.

4. In combination with a slotted rotating cylinder, two or more locking-disks, *c*, and cocks $P^3$, a notched disk, *z*, on the shaft of one or more of the disks *c*, and an armature-lever and electro-magnet for each disk *z*, the same being included in a train-actuated electric circuit, substantially as set forth.

5. A system of apparatus for railway-crossing signals, having in combination a slotted rotary cylinder, a series of two or more rotary disks to enter or clear the slots of the same, fluid-pressure cocks with pipe-connections to actuate the signals, and one or more electro-magnets, the circuit-wires of which are connected with an insulated track section or sections, substantially as set forth, whereby the short-circuiting of a track-section shall drop an armature-lever and lock the cylinder.

OSCAR GASSETT.

In presence of—
DANIEL W. EDGECOMB,
CHARLES A. TERRY.